Feb. 20, 1951  F. R. FORD  2,542,277
PRESSURE ROLLER ADJUSTING MEANS
FOR DUPLICATING MACHINES
Filed April 9, 1947  2 Sheets-Sheet 1

INVENTOR
Frank Ronald Ford.
BY Otto Munk
HIS ATTORNEY.

Feb. 20, 1951   F. R. FORD   2,542,277
PRESSURE ROLLER ADJUSTING MEANS
FOR DUPLICATING MACHINES
Filed April 9, 1947   2 Sheets-Sheet 2

INVENTOR
Frank Ronald Ford
BY Otto Munk
HIS ATTORNEY.

UNITED STATES PATENT OFFICE 2,542,277

PRESSURE ROLLER ADJUSTING MEANS FOR DUPLICATING MACHINES

Frank Ronald Ford, Birmingham, England

Application April 9, 1947, Serial No. 740,446
In Great Britain November 16, 1945

Section 1, Public Law 690, August 8, 1946
Patent expires November 16, 1965

8 Claims. (Cl. 101—132)

This invention relates to duplicating machines of the general class in which a copy sheet and a master sheet bearing in reversed script the matter to be reproduced are passed in pressure contact between a cylinder which carries the master sheet and a pressure roller, the copy sheet being moistened before being brought into contact with the master sheet.

More particularly the invention has reference to that type of machine in which the pressure roller spindle is supported in bearings movably mounted on the machine frame, these bearings being operatively connected to crank arms on a shaft which can be oscillated to vary the pressure exerted on the cylinder or entirely to separate the pressure roller from the latter.

In my prior U. S. Patent No. 2,399,175, issued April 30, 1946, I have described a machine of the type in question having an actuating lever on the crank arm shaft connected by a link to a separate operating lever which is movable about a pivot on the machine frame, this operating lever being provided with a spring plunger adapted to engage in succession a number of depressions in an adjacent stationary surface.

The connection between each bearing and the associated crank arm in this prior construction comprises a rod having an operative engagement with the bearing and adapted to slide through a trunnion carried by the crank arm, a spring on the rod acting between the trunnion and an abutment on the rod in a manner to move the pressure roller towards the cylinder, and a second spring on the rod acting between the machine frame and a second abutment on the rod at the side of the trunnion remote from the first abutment.

The present invention has for its object to provide an improved construction of the pressure-adjusting means.

According to one feature of the present invention angular adjustment of the crank arm shaft is effected through the medium of a ratchet wheel having associated therewith driving and retaining pawls which are acted upon by an operating lever, successive movements of the latter to one extreme position producing a step-by-step rotation of the ratchet wheel in a manner to increase the loading of the pressure roller, and a single movement to the other extreme position effecting a complete removal of the pressure.

The ratchet wheel may be mounted on a shaft which also carries a crank, the crank pin engaging a slot in an actuating lever on the crank arm shaft, equal angular movements of the ratchet wheel from one extreme position first bringing the pressure roller into contact with the cylinder and then increasing the pressure on the latter by progressively diminishing increments.

According to a further feature of the invention, a rod in operative engagement with each bearing engages slidably a trunnion carried by the adjacent crank arm, and has a compression spring mounted thereon at one side only of such trunnion, the spring being interposed between the trunnion and an abutment on the rod.

The invention is illustrated in the accompanying drawings, wherein.

Figure 1:
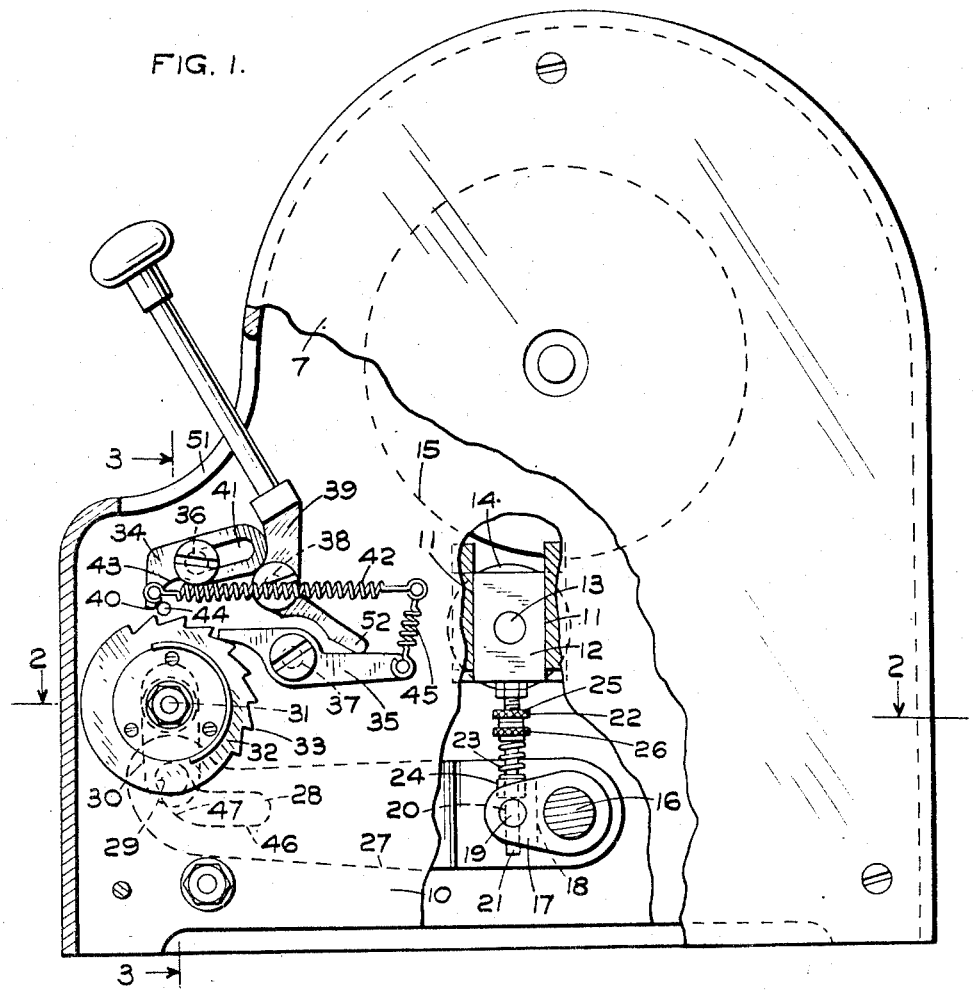
Figure 1 is a view in side elevation partly in section.
Figure 2:
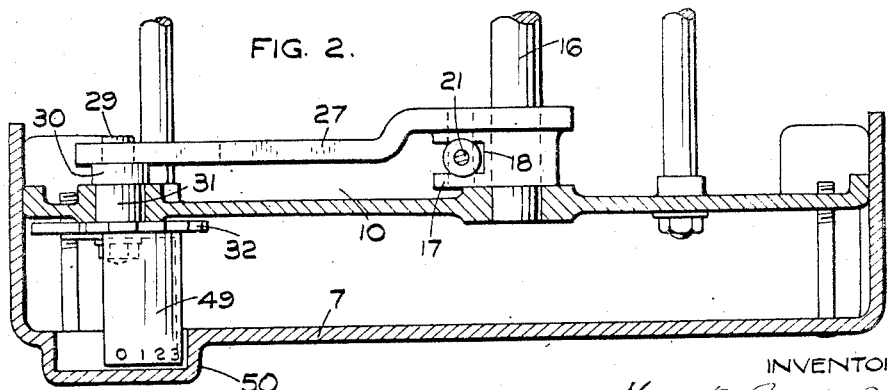
Figure 2 is a fragmentary view in section on the line 2—2 of Figure 1.
Figure 3:
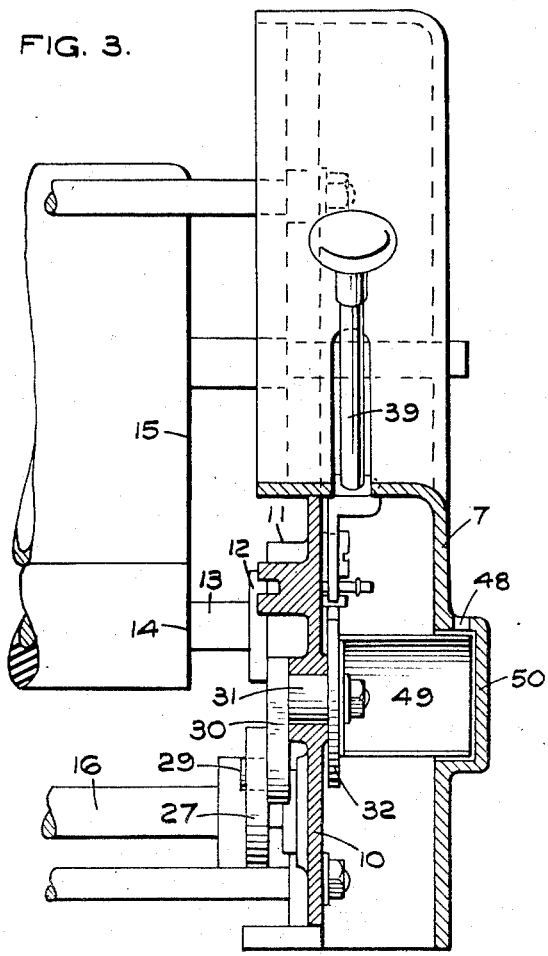
Figure 3 is a fragmentary view in section on the line 3—3 of Figure 1.

In the construction illustrated the inner faces of the side frames 10 of the machine are provided with ribs forming vertical guides 11 in which are slidably mounted bearings 12 carrying the ends of the spindle 13 of the pressure roller 14, which latter is disposed below the cylinder 15 with its axis parallel thereto.

A shaft 16, which also extends parallel to the cylinder but at a lower level than the pressure roller, is oscillatably mounted in the side frames 10, and is provided with a crank arm 17 beneath each of the bearings aforesaid.

The end of each crank arm is slotted at 18 in a vertical plane and drilled horizontally to receive a trunnion 19, the latter having a diametral clearance hole 20 through which extends a vertical rod 21 having its upper end connected to the adjacent bearing 12.

Conveniently the rod 21 has its upper end screw-threaded to engage a tapped hole in the bearing and provided with locknuts 22 engaging the underside of the latter. Alternatively, the end of the rod above the nuts may engage in a plain hole in the bearing.

A helical compression spring 23 is mounted on a washer 24 on the rod above the trunnion 19 and acts between the washer 24 and a suitable abutment on the rod. Preferably such abutment is adjustable and may be constituted by a knurled or milled nut 26 on the threaded upper portion of the rod, such nut, once adjusted, being locked by a second similar nut 25.

The operating means for the crank arm shaft 16 comprises an actuating lever 27 fixed thereto adjacent one of the crank arms and formed with a longitudinal slot 28 adjacent its free end.

In this slot engages a crank pin 29 on an arm 30 at the inner end of a short shaft 31 mounted in the adjacent side frame 10 of the machine.

To the outer end of this shaft is secured a wheel 32 formed over a portion of its periphery with ratchet teeth 33 adapted for engagement by driving and retaining pawls 34, 35 pivotally mounted at 36, 37 upon the exterior of the side frame 10.

Also pivoted, at 38, to the side frame 10 intermediate the pawls is an operating lever 39, which when moved towards the front of the machine acts upon the driving pawl 34 in such a manner as to urge it into engagement with the ratchet wheel 32, which is thereupon rotated in a direction to increase the pressure exerted on the cylinder.

The driving pawl 34 has a downwardly-directed nose 40 and a longitudinal slot 41 through which its pivot pin 36 passes.

When pressure on the operating lever is relaxed the pawl is retracted relatively to its pivot 36 by a tension spring 42, the line of action of which is so arranged that the underside 43 of the pawl nose 40 bears against a peg 44 on the side frame. The portion of the pawl engaging this peg is so profiled that during retraction of the pawl the nose of the latter rides upwardly and disengages itself from the ratchet wheel.

Under these conditions reverse rotation of the ratchet wheel under the influence of the pressure roller springs 23 is prevented by the retaining pawl 35, which is spring-biased into constant engagement with the ratchet wheel. The retaining pawl conveniently takes the form of a two-armed lever with a tension spring 45 acting upon the rear arm thereof.

Assuming that the machine has been left standing with the pressure roller clear of the cylinder, the slidable bearings 12 will then be in their lowermost position and the driving pawl 34 will be located above the first ratchet tooth, its rear end bearing against the operating lever 39 and holding the latter in its normal position.

To bring the pressure roller 14 into contact with the cylinder 15, but without exerting any pressure thereon, the operating lever is pulled forwards so as to advance the ratchet wheel by one tooth, the operating lever 39 when released automatically returning to its normal position.

The slot 28 in the actuating lever is of L shape, with a main portion 46 disposed longitudinally of the lever, and a short curved transverse portion 47, which receives the crank pin 29 when the ratchet wheel is in the "roller clear" position.

The first movement of the operating lever above described brings the crank pin out of the transverse portion 47 into the main portion of the slot 46, this being the "no pressure" position of the ratchet wheel 32, and thereafter successive forward movement of the lever through its full travel turns the ratchet wheel tooth by tooth and increases the roller pressure by progressively diminishing increments.

For the sake of appearance, the ratchet wheel 32 and pawls 34, 35 are concealed behind a cover member 7 applied to the exterior of the side frame on which they are mounted, and with such an arrangement the angular position of the ratchet wheel at any moment may be indicated by a numeral appearing at a window 48 in the cover member.

Conveniently, the ratchet wheel has mounted thereon a coaxial shell 49 of part-cylindrical form which turns within a concentric hollow projection 50 on the cover member, the shell aforesaid bearing a row of angularly-spaced numerals which appear through the window 48 in the wall of the hollow projection 50. These numerals may run from 0 to 5, "0" representing the "roller clear" position, "1" the "no pressure" position, "2" the lightest loading condition, and so on.

If it is desired to return the parts to the "roller clear" condition (for example to permit a new master sheet to be applied to the cylinder) the operating lever 39, which projects through a slot 51 in the cover member 7, is moved rearwardly from its normal position.

This causes a suitably arranged spur 52 on the operating lever to engage the rear end of the retaining pawl 35 and thus free the nose of the latter from the ratchet wheel, which then returns to the "roller clear" position under the influence of the roller loading springs 23.

What I claim then is:

1. In a duplicating machine of the kind specified having a frame, a cylinder, and a pressure roller, means for adjusting the pressure of the pressure roller on the cylinder comprising an adjusting shaft oscillatably mounted in the frame parallel to the axis of the pressure roller, a bearing for each end of the pressure roller slidably mounted on the adjacent side frame of the machine, a crank arm mounted on each end of said adjusting shaft, means connecting each crank arm with the adjacent pressure roller bearing, an actuating lever fixed on said adjusting shaft at one end, an operating shaft mounted in the frame parallel to the axis of the pressure roller, an arm on said operating shaft, said actuating lever having a slot in its free end, one end portion of the slot being curved, a pin fixed to said arm on the operating shaft and engaging in said slot, said pin being in the curved portion of the slot when the pressure roller is clear of the cylinder, and manually-operable means on the frame for turning said operating shaft.

2. In a duplicating machine of the kind specified having a frame, a cylinder, and a pressure roller, means for adjusting the pressure of the pressure roller on the cylinder comprising an adjusting shaft oscillatably mounted in the frame parallel to the axis of the pressure roller, a bearing for each end of the pressure roller slidably mounted on the adjacent side frame of the machine, a crank arm mounted on each end of said adjusting shaft, means connecting each crank arm with the adjacent pressure roller bearing, an actuating lever fixed on said adjusting shaft at one end, an operating shaft mounted in the frame parallel to the axis of the pressure roller, an arm on said operating shaft, said arm being disposed transversely to said actuating lever, said actuating lever having a slot in its free end, one end portion of the slot being curved and disposed obliquely to the length of said arm, a pin fixed to said arm on the operating shaft and engaging in said slot, said pin being in the curved portion of the slot when the pressure roller is clear of the cylinder, and manually-operable means on the frame for turning said operating shaft.

3. In a duplicating machine of the kind specified having a frame, a cylinder, and a pressure roller, means for adjusting the pressure of the pressure roller on the cylinder comprising an adjusting shaft oscillatably mounted in the frame parallel to the axis of the pressure roller, a bearing for each end of the pressure roller slidably mounted on the adjacent side frame of the machine, a crank arm mounted on each end of said adjusting shaft, means connecting each crank arm with the adjacent pressure roller bearing, an actuating lever fixed on said adjusting shaft at one end, an operating shaft mounted in the frame parallel to the axis of the pressure roller, an arm on said operating shaft, said arm being disposed transversely to said actuating lever, said actuating lever having a slot in its free end, said slot having two portions disposed at an obtuse angle to each other, a pin fixed to said arm on the operating shaft and engaging in said slot, and manually-operable means on the frame for turning said operating shaft.

4. In a duplicating machine of the kind specified having a frame, a cylinder, and a pressure roller, means for adjusting the pressure of the pressure roller on the cylinder comprising an adjusting shaft oscillatably mounted in the frame parallel to the axis of the pressure roller, a bearing for each end of the pressure roller slidably mounted on the adjacent side frame of the machine, a crank arm mounted on each end of said adjusting shaft, means connecting each crank arm with the adjacent pressure roller bearing, an actuating lever fixed on said adjusting shaft at one end, an operating shaft mounted in the frame parallel to the axis of the pressure roller, an arm on said operating shaft, a crank pin on said arm, said actuating lever having an L-shaped slot the two portions of which are disposed at an obtuse angle to each other, one portion being approximately parallel to said actuating lever, and the other portion being disposed obliquely to the length of said arm, said crank pin engaging in said slot and being in the oblique portion of the slot when the pressure roller is clear of the cylinder, and manually-operable means on the frame for turning said operating shaft.

5. In a duplicating machine of the kind specified having a frame, a cylinder, and a pressure roller, means for adjusting the pressure of the pressure roller on the cylinder comprising an adjusting shaft oscillatably mounted in the frame parallel to the axis of the pressure roller, a bearing for each end of the pressure roller slidably mounted on the adjacent side frame of the machine, a crank arm mounted on each end of said adjusting shaft, means connecting each crank arm with the adjacent pressure roller bearing, an actuating lever fixed on said adjusting shaft at one end, an operating shaft mounted in the frame parallel to the axis of the pressure roller, an arm on said operating shaft, said actuating lever having a slot in its free end, a pin fixed to said arm on the operating shaft and engaging in said slot, a ratchet wheel on said operating shaft, a driving pawl pivoted to the frame, a retaining pawl pivoted to the frame, said pawls cooperating with the ratchet wheel, and an operating lever pivoted to the frame, said operating lever cooperating with the driving pawl to rotate the ratchet wheel with a step-by-step motion.

6. In a duplicating machine of the kind specified having a frame, a cylinder, and a pressure roller, means for adjusting the pressure of the pressure roller on the cylinder comprising an adjusting shaft oscillatably mounted in the frame parallel to the axis of the pressure roller, a bearing for each end of the pressure roller slidably mounted on the adjacent side frame of the machine, a crank arm mounted on each end of said adjusting shaft, means connecting each crank arm with the adjacent pressure roller bearing, an actuating lever fixed on said adjusting shaft, an operating shaft at one end mounted in the frame parallel to the axis of the pressure roller, an arm on said operating shaft, said actuating lever having a slot in its free end, a pin fixed to said arm on the operating shaft and engaging in said slot, a ratchet wheel on said operating shaft, a driving pawl pivoted to the frame, a retaining pawl pivoted to the frame, said pawls cooperating with the ratchet wheel, and an operating lever pivoted to the frame, said operating lever having a portion on one side engaging the driving pawl and a portion on the opposite side engaging the retaining pawl, whereby successive movements of the operating lever from a normal position towards one extreme position produce step-by-step rotation of the ratchet wheel in a manner to increase the loading of the pressure roller, and a single movement of the operating lever from the normal position towards the other extreme position effects complete removal of the loading of the pressure roller.

7. In a duplicating machine of the kind specified having a frame, a cylinder, and a pressure roller, means for adjusting the pressure of the pressure roller on the cylinder comprising an adjusting shaft oscillatably mounted in the frame parallel to the axis of the pressure roller, a bearing for each end of the pressure roller slidably mounted on the adjacent side frame of the machine, a crank arm mounted on each end of said adjusting shaft, means connecting each crank arm with the adjacent pressure roller bearing, an actuating lever fixed on said adjusting shaft at one end, an operating shaft mounted in the frame parallel to the axis of the pressure roller, an arm on said operating shaft, said actuating lever having a slot in its free end, a pin fixed to said arm on the operating shaft and engaging in said slot, a ratchet wheel on said operating shaft, a driving pawl pivoted to the frame, said driving pawl having a nose at one end for engaging the ratchet teeth, said pawl having a longitudinal slot through which a pivot pin carried by the frame projects, a spring acting on said driving pawl, a peg on the frame, said spring keeping one edge of the driving pawl in engagement with said peg, an operating lever pivoted to the frame, said operating lever bearing on one end of the pawl and being adapted when rocked to slide the pawl to bring its nose into driving engagement with the ratchet teeth, a retaining pawl pivoted to the frame, and a spur on said operating lever adapted to engage the retaining pawl.

8. In a duplicating machine of the kind specified having a frame, a cylinder, and a pressure roller, means for adjusting the pressure of the pressure roller on the cylinder comprising an adjusting shaft oscillatably mounted in the frame parallel to the axis of the pressure roller, a bearing for each end of the pressure roller slidably mounted on the adjacent side frame of the machine, a crank arm mounted on each end of said adjusting shaft, means connecting each crank arm with the adjacent pressure roller bearing, an actuating lever fixed on said adjusting shaft at one end, an operating shaft mounted on the frame parallel to the axis of the pressure roller, an arm on said operating shaft, said actuating lever having a slot in its free end, a pin fixed to said arm on the operating shaft and engaging in said slot, a ratchet wheel on said operating shaft, a driving pawl pivoted to the frame, a retaining pawl pivoted to the frame, said pawls cooperating with the ratchet wheel, an operating lever pivoted to the frame, said operating lever cooperating with the driving pawl to rotate the ratchet wheel with a step-by-step motion, a coaxial shell on said ratchet wheel, said shell having a portion of part-cylindrical form, and a cover on the outer side of the frame enclosing said ratchet wheel and said shell, said cover having a hollow projection provided with an opening, said hollow projection extending around a portion of said shell.

FRANK RONALD FORD.

REFERENCES CITED

The following references are of record in the file of this patent:

UNITED STATES PATENTS

| Number | Name | Date |
|---|---|---|
| 2,165,972 | Kokay | July 11, 1939 |
| 2,349,634 | Neal | May 23, 1944 |
| 2,399,175 | Ford | Apr. 30, 1946 |